United States Patent
Nagase et al.

(10) Patent No.: US 9,021,946 B2
(45) Date of Patent: May 5, 2015

(54) PRESS MACHINE AND METHOD OF CONTROLLING THE SAME

(75) Inventors: Hiroshi Nagase, Kanagawa (JP); Yasuhiko Tanaka, Kanagawa (JP); Kenji Suzuki, Kanagawa (JP); Hiroaki Yoshida, Kanagawa (JP)

(73) Assignee: Aida Engineering, Ltd., Kanagawa (JP)

( * ) Notice: Subject to any disclaimer, the term of this patent is extended or adjusted under 35 U.S.C. 154(b) by 491 days.

(21) Appl. No.: 12/883,595

(22) Filed: Sep. 16, 2010

(65) Prior Publication Data

US 2011/0061547 A1   Mar. 17, 2011

(30) Foreign Application Priority Data

Sep. 17, 2009   (JP) ................. 2009-215179

(51) Int. Cl.
| | | |
|---|---|---|
| B30B 13/00 | (2006.01) | |
| B30B 1/26 | (2006.01) | |
| B30B 15/14 | (2006.01) | |
| H02P 21/00 | (2006.01) | |
| H02P 21/06 | (2006.01) | |

(52) U.S. Cl.
CPC ............ *B30B 15/148* (2013.01); *B30B 1/26* (2013.01); *H02P 21/0089* (2013.01); *H02P 21/06* (2013.01)

(58) Field of Classification Search
CPC ........ B30B 1/26; B30B 15/148; B30B 1/263; B30B 1/266; B30B 13/00; H02P 21/0089; H02P 21/06

USPC .......... 100/35, 43, 48, 50, 280, 282; 72/20.1, 72/443; 700/206

See application file for complete search history.

(56) References Cited

U.S. PATENT DOCUMENTS

| | | | |
|---|---|---|---|
| 3,412,301 A | 11/1968 | Mead et al. | |
| 3,621,348 A | 11/1971 | Uchida et al. | |
| 6,211,636 B1 | 4/2001 | Matsubara et al. | |
| 7,284,407 B2 * | 10/2007 | Imaeda | 72/443 |
| 7,401,548 B2 * | 7/2008 | Kohno et al. | 100/289 |
| 7,434,505 B2 * | 10/2008 | Suzuki et al. | 100/43 |
| 2003/0106738 A1 * | 6/2003 | Yoneda et al. | 180/446 |
| 2006/0156933 A1 | 7/2006 | Hofele et al. | |
| 2007/0283823 A1 | 12/2007 | Zeigler et al. | |

FOREIGN PATENT DOCUMENTS

| | | |
|---|---|---|
| DE | 1752946 A1 | 4/1970 |
| EP | 0929145 A2 | 7/1999 |
| EP | 0929145 A2 | 7/1999 |
| GB | 617563 | 2/1949 |
| JP | 10-249597 | 9/1998 |

(Continued)

OTHER PUBLICATIONS

European Search Report for EP Patent Application No. EP 10174622, which was mailed on Feb. 15, 2012, which corresponds to the present application.

(Continued)

*Primary Examiner* — Jimmy T Nguyen
(74) *Attorney, Agent, or Firm* — McDermott Will & Emery LLP

(57) ABSTRACT

Provided is a press machine for driving a slide by a motor, including a control device for controlling driving of the motor, in which the press machine has a press capacity which can be variably controlled by using field control for the motor.

8 Claims, 14 Drawing Sheets

CONTROL DEVICE
201 OPERATION CONDITION SETTING SECTION
201a CAPACITY SETTING SECTION
202 MOTION COMMAND SECTION
203 POSITION/SPEED CONTROL SECTION
204 TORQUE LIMITING SECTION
205 d-/q-AXIS CURRENT COMMAND SECTION
206 d-/q-AXIS CURRENT CONTROL SECTION
207, 210 COORDINATE CONVERTING SECTION
208 PWM CONTROL SECTION

(56) References Cited

FOREIGN PATENT DOCUMENTS

| | | |
|---|---|---|
| JP | 11077389 | 3/1999 |
| JP | 11-197897 | 7/1999 |
| JP | 2001-150193 A | 6/2001 |
| JP | 2006-192467 A | 7/2006 |
| JP | 2007-228744 A | 9/2007 |
| JP | 2008-119737 A | 5/2008 |
| WO | WO 2007/091964 A2 | 8/2007 |

OTHER PUBLICATIONS

Chinese Office Action issued Feb. 5, 2013 in Chinese Patent Application No. 201010287304.2.

Japanese Office Action issued in Japanese Patent Application No. JP 2009-215179 dated Feb. 26, 2013.

* cited by examiner d-AXIS CURRENT COMMAND

ROTATION SPEED N

LARGER TORQUE COMMAND $$\text{q-AXIS CURRENT COMMAND} = \frac{\text{TORQUE COMMAND}}{\text{MAGNETIC FLUX OF PERMANENT MAGNET} + (L_d - L_q) \cdot \text{d-AXIS CURRENT COMMAND}}$$

$\cdots$ (EXPRESSION 1)

WHERE K: CONSTANT $L_d$, $L_q$: d-AXIS INDUCTANCE AND q-AXIS INDUCTANCE OF MOTOR, RESPECTIVELY

PRESS MACHINE AND METHOD OF CONTROLLING THE SAME

CROSS REFERENCE TO RELATED APPLICATIONS

The present application claims priority under 35 U.S.C. §119 to Japanese Patent Application No. 2009-215179, filed Sep. 17, 2009, which is incorporated herein by reference.

FIELD OF THE INVENTION

The present invention relates to a press machine and a method of controlling the same.

BACKGROUND

For example, as described in Japanese Patent Application Laid-Open No. 2006-192467, a servo-press machine has a feature that an operation of a slide can be variably controlled in response to various requests so that an operation pattern of the servo-press machine can be selected.

In the servo-press machine, a torque capacity of the servo-press machine (capacity expressed by the amount of pressure which can be generated and a distance in millimeter above bottom dead center (BDC) where the pressure is generated) and a press operating speed (strokes per minute (SPM)) which can be achieved at the time when the pressure is generated depend on the capacity of a servomotor which is used for the servo-press machine.

Specifically, the characteristics of the press machine such as the torque capacity and the production speed are determined by a maximum rotation speed and a maximum torque characteristic of the motor. Therefore, if the torque capacity and the production speed obtained only with the used motor are insufficient, a method involving performing pressurization by using a plurality of motors, that is, the combination of the servomotor and a linear motor (see Japanese Patent Application Laid-Open No. 2001-150193, and the like) and a method involving switchably using a plurality of motors for different steps performed by the press machine (see Japanese Patent Application Laid-Open No. 2008-119737, and the like) have been proposed.

Although an object of a press process including press working can be achieved with the methods described in Japanese Patent Application Laid-Open No. 2001-150193 and Japanese Patent Application Laid-Open No. 2008-119737, there is a fear in that the press machine becomes complex due to the use of the plurality of motors or the use of the plurality of motors separately for the different steps.

SUMMARY OF THE INVENTION

The present invention has been made in view of the problems described above, and therefore has an object to provide a press machine capable of variably controlling a capacity (or performance) of the press machine (press capacity) such as a torque capacity (or pressure force generation characteristic during one stroke of a slide which makes reciprocating movement (hereinafter, the characteristic is also referred to as stroke pressure characteristic) or a production speed according to various required characteristics even though a configuration of the press machine is simple and low-cost, and a method of controlling the press machine.

The present invention provides a press machine for driving a slide by a motor, including a control device for controlling driving of the motor, in which the press machine has a press capacity which can be variably controlled by using field control for the motor.

In the present invention, the press capacity may include a torque capacity (or stroke pressure characteristic) of the press machine.

In the present invention, the press capacity may include any one of SPM and a moving speed of the slide.

In the present invention, the variable control of the press capacity may be performed by variably controlling at least one of a pressure force generation characteristic with respect to a position of the slide, a maximum pressure force exerted on a work piece, a processing speed at a time of generation of the maximum pressure force, and a position where a capacity for generating the maximum pressure force is generated.

In the present invention, the press machine may be configured to limit a torque command to the motor based on a content of the variable control of the press capacity.

In the present invention, when the motor is an AC motor, the press machine may be configured to obtain information related to a d-axis current based on at least one of a rotation speed of the motor, a torque command, and a DC voltage of a power converter for driving the motor, to perform the field control.

In the present invention, the press machine may be configured to change a command for a d-axis current in the field control according to an operation pattern of the press machine.

In the present invention, the press machine may be configured to change the command for the d-axis current in the field control according to an operation frequency.

The present invention also provides a method of controlling a press machine for driving a slide by a motor, including controlling driving of the motor, in which the press machine has a press capacity which can be variably controlled by using field control for the motor.

In the present invention, the method may further include changing the command for the d-axis current in the field control according to the operation pattern of the press machine.

In the present invention, the method may further include changing the command for the d-axis current in the field control according to the operation frequency.

According to the present invention, the press machine, capable of variably controlling the press capacity such as the torque capacity (or pressure force generation characteristic during one stroke of the slide which makes reciprocating movement (stroke pressure characteristic)) or the production speed according to various required characteristics while preventing the motor, the control device, and a power-supply facility from being increased in size and being complex even though the configuration of the press machine is simple and low cost, and the method of controlling the press machine, can be provided.

According to the present invention, for example, the torque capacity (capacity of generating the pressure force to be exerted on a work piece) can be variably controlled by using the field control. Further, an output of the motor is variably controlled by using the field control. As a result, the torque capacity (capacity of generating the pressure force exerted on the work piece) is controlled so as to be continuously varied during a press stroke.

According to the present invention, the type of capacity can be selected depending on which of the torque capacity and the operating speed for pressurization is regarded as more important as a requirement of the press working.

Moreover, even when the capacity of the press machine can be variably controlled as in the present invention, the press machine having the pressure force which does not exceed a set maximum pressure force can be provided by limiting a torque command given to the motor according to the content of the variable control.

DESCRIPTION OF THE PREFERRED EMBODIMENTS

Hereinafter, embodiments of the present invention are described referring to the accompanying FIGS. 1 to 11. The present invention is not limited to the embodiments described below.

Figure 1:
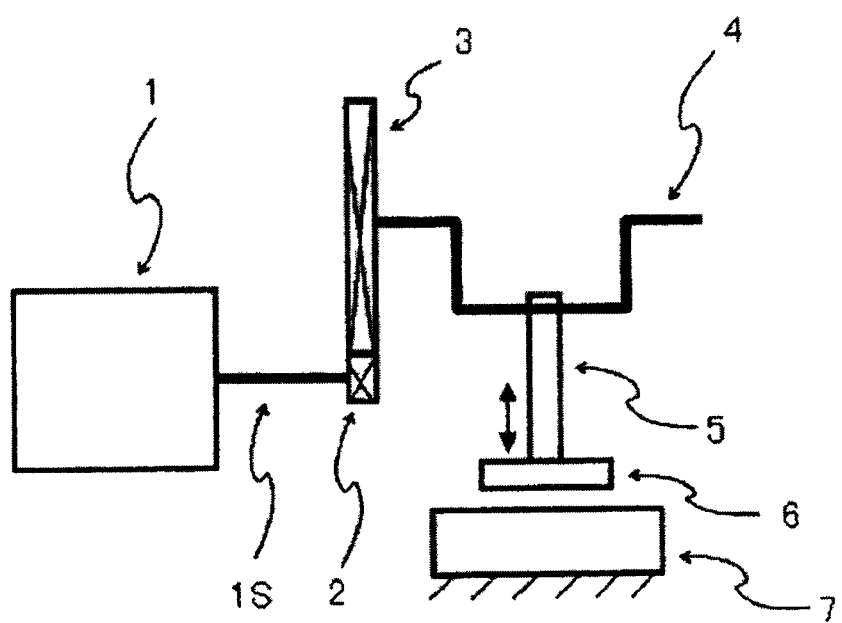
FIG. 1 is a diagram illustrating a configuration example of a press machine to which the present invention is applied.

FIG. 1 illustrates a servo-press machine illustrated in a simplified manner as an example to which the present invention is applied.

Here, an example is described where the present invention is applied to a crank press as the press machine, in which a crank mechanism is used for converting rotational movement corresponding to an output of a servomotor into reciprocating movement of a slide. A main gear 3 is meshed with a gear 2 connected to a shaft 1S of an AC motor 1. The crank mechanism (crank shaft 4 and connecting rod 5) is connected to the main gear 3.

A slide 6 is structured so that the slide 6 can be raised and lowered with respect to (separated away from and brought into contact with) a bolster 7 on a stationary side by the crank mechanism in 10, a direction indicated by an arrow illustrated in FIG. 1.

The crank shaft 4 is rotatably driven in conjunction with forward rotation, reverse rotation, and variable-speed control of the AC motor 1. Therefore, various motions of the slide 6 (hereinafter, the motion (operation) of the slide 6 is also referred to as a slide motion) can be freely set such as a slide motion other than a slide motion made by a steadily and unidirectionally-rotated crank mechanism, a slide motion adapted to a body to be molded, which includes a static slide motion, or a forward or reverse pendular motion. Any one of various slide motions described above can be appropriately selected so as to be used in a switched manner.

Therefore, adaptability to processing accuracy for a press-molded body and, in addition, to productivity and the like can be improved.

As the AC motor 1, a synchronous motor using a permanent magnet, an induction motor, a reluctance motor, or the like may be used. Further, a DC motor may be used in place of the AC motor. Herein, the AC motor 1 is described as a permanent-magnet synchronous motor.

Moreover, although FIG. 1 illustrates the crank press as an example, a press machine having another structure, for example, a structure using a ball screw or a linear motor, may be used.

First Embodiment

Figure 2:
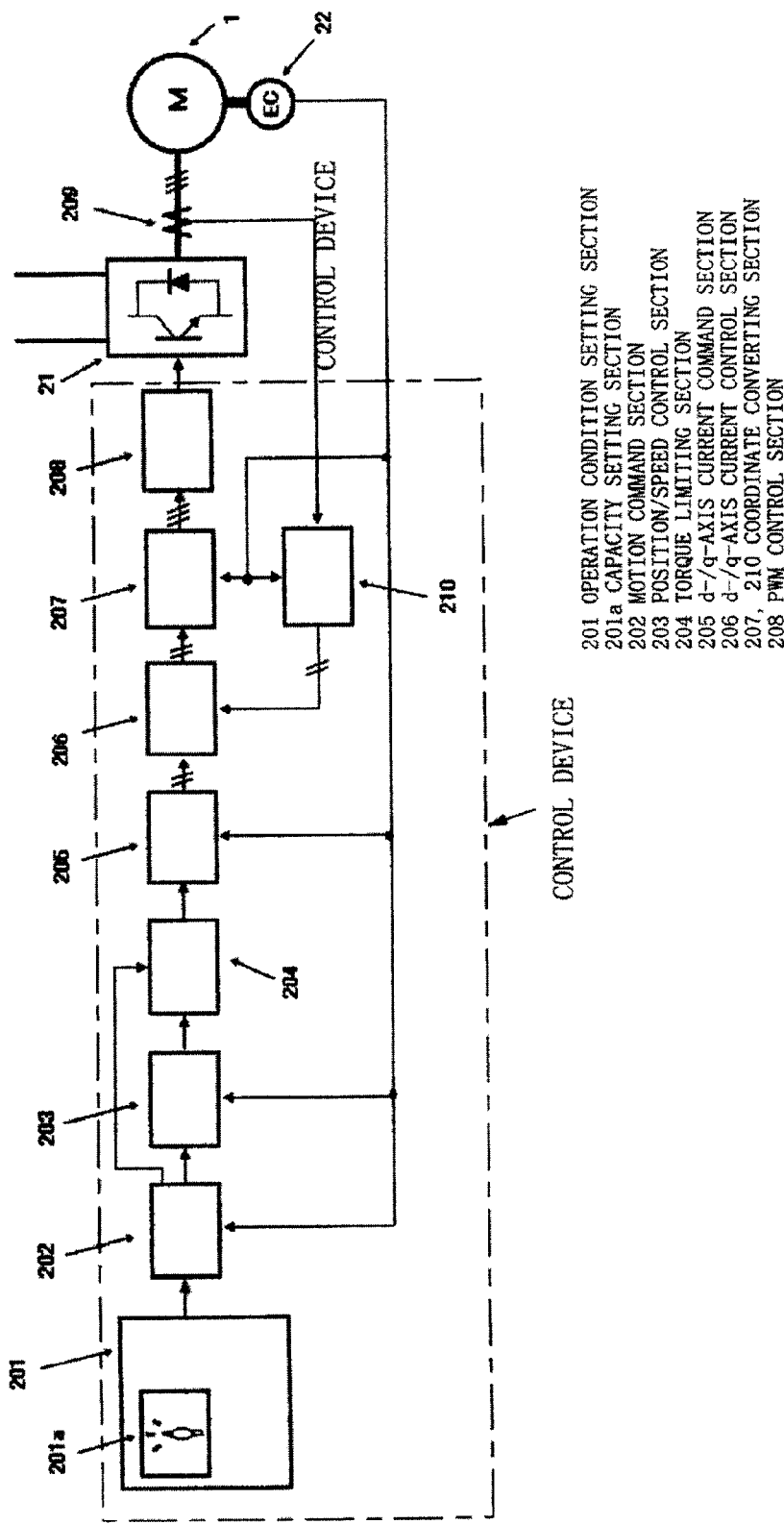
FIG. 2 is a control block diagram illustrating a control device according to first, second, and third embodiments of the present invention.

FIG. 2 illustrates an embodiment of a device for controlling the servo-press machine illustrated in FIG. 1.

A first embodiment corresponds to an example where a maximum torque generated (output) by a motor is constant, but a position where a torque of the motor is generated (position of the slide 6 above BDC (angular position of the crank)) is changed by field control, specifically, a mode of generation of the torque with respect to the position of the slide 6 above BDC (angular position of the crank) is changed by the field control.

For the field control for the motor, if a rotation speed falls within the range of a high-speed rotation speed equal to or higher than a predetermined speed, a counter electromotive force (generated voltage) increases to make the control difficult, which results in reduction of output. Therefore, various methods such as a method of weakening a magnetic field as field-weakening control have been proposed. In this embodiment, the known field control method as described above may be used.

A DC-side of an inverter 21 is connected to a DC power source (not shown) so that electric power is supplied to the inverter 21. An AC-side of the inverter 21 is connected to an AC motor 1 so that the AC motor 1 is driven by a variable AC voltage at a variable frequency from the inverter 21. A rotation speed or a rotational position of the AC motor 1 is detected by an encoder 22.

Next, the control device is described. A control system is constituted by a digital circuit. In the control system, computation is performed by a central processing unit (CPU), whereas a program and a parameter required for the computation are stored in a memory. A configuration of the control system is known, and therefore, the detailed description thereof is herein omitted.

A command for a rotational position and a rotation speed (hereinafter, also referred to simply as a position/speed command) to the AC motor 1 is output from a motion command section 202. A signal from the motion command section 202 is set and output in the following manner.

In a capacity setting section 201a, a maximum pressure force and a position where the maximum pressure force is generated (position above BDC), which are required for the press machine, that is, a torque capacity of the press mechanism is selected.

Further, a press operation pattern according to processing conditions are set in an operation condition setting section 201. Upon input of a start signal, a motion command for driving the AC motor 1 is output from the motion command section 202 as the set press operation pattern, specifically, a motor operation pattern for realizing the press operation pattern.

The capacity setting section 201a is described in detail below.

A position/speed control section 203 is operated by the position/speed command from the motion command section 202 and a feedback signal from the encoder 22 to output the torque command for the AC motor 1. The torque command signal is input to a torque limiting section 204.

The torque limiting section 204 functions so as to be able to limit the torque command which is actually given to the AC motor 1 according to the conditions selected in the capacity setting section 201a. If the torque command signal from the position/speed control section 203 is within the limit, the torque limiting section 204 does not perform torque limitation. Here, an output from the torque limiting section 204 is referred to as an actual torque command. The actual torque command from the torque limiting section 204 is input to a d-/q-axis current command section 205, from which signals for commands of a d-axis current and a q-axis current of the AC-motor 1 are output.

The d-/q-axis current command section 205 illustrated in FIG. 2 outputs a d-axis current command and a q-axis current command according to an actual torque command signal and a motor rotation speed.

Figure 3:
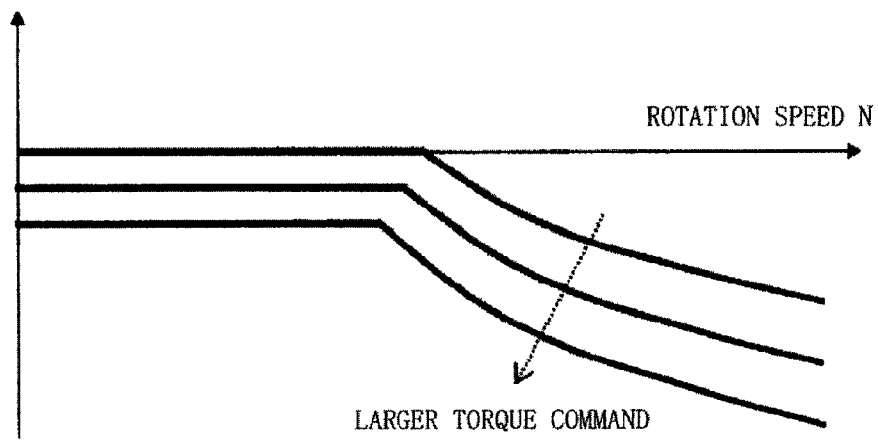
FIG. 3 is a map showing an example of setting of a d-axis current command and a q-axis current command according to a control method of the first to third embodiments.

FIG. 3 shows an example of setting of the signals (d-axis current command and q-axis current command) set in the d-/q-axis current command section 205 by referring to a map or the like based on the actual torque command and the motor rotation speed from the torque limiting section 204. In this case, a control pattern is set so that the torque generated by the motor is increased in response to the actual torque command and a terminal voltage of the motor does not exceed a predetermined voltage with respect to a rotation speed N.

As shown in FIG. 3, the d-axis current command is determined so that an absolute value of the d-axis current command increases on the negative side as the motor rotation speed increases and the absolute value of the d-axis current command increases on the negative side as a value of the torque command increases. As described above, upon determination of the d-axis current command value (according to (Expression 1) described in FIG. 3), the q-axis current command value is determined. The pattern of the d-axis current command, which is shown in FIG. 3, is merely an example. A calculation by a theoretical expression, a calculation by a simplified expression, an experimental expression, an experimental value, or the like is appropriately selected according to a motor structure or a desired accuracy for the torque control. The computation expressed by (Expression 1) described in FIG. 3 is also merely an example. The q-axis current command may also be obtained by an approximate calculation or an experimental expression without performing the computation expressed by (Expression 1). Moreover, the actual d-axis current command and q-axis current command may be computed according to an expression or may be realized by a pattern using a memory map. The method of obtaining the actual d-axis current command and q-axis current command is appropriately selected depending on the configuration of the control system.

The AC motor 1 is controlled by the d-axis current command and the q-axis current command as described above. With the pattern shown in FIG. 3, so-called field control of the AC-motor, for changing a magnetic flux of the permanent magnet motor, is realized.

Although the case where the AC motor 1 is the permanent-magnet synchronous motor is described in this embodiment, the field control can also be performed by field winding current control in the case where a wound-rotor type synchronous motor is used. Further, the field winding current control and the d-/q-axis current control may be used in combination. Further, even when the induction motor or the reluctance motor is used, the field control can be performed in the same way. Moreover, the field winding current control can also be performed for the DC motor.

On the other hand, the field control for the AC motor is realized not only by giving the d-axis current command and the q-axis current command on rectangular coordinates but also by giving commands for the degree and the phase of the current on cylindrical coordinates.

Figure 4:
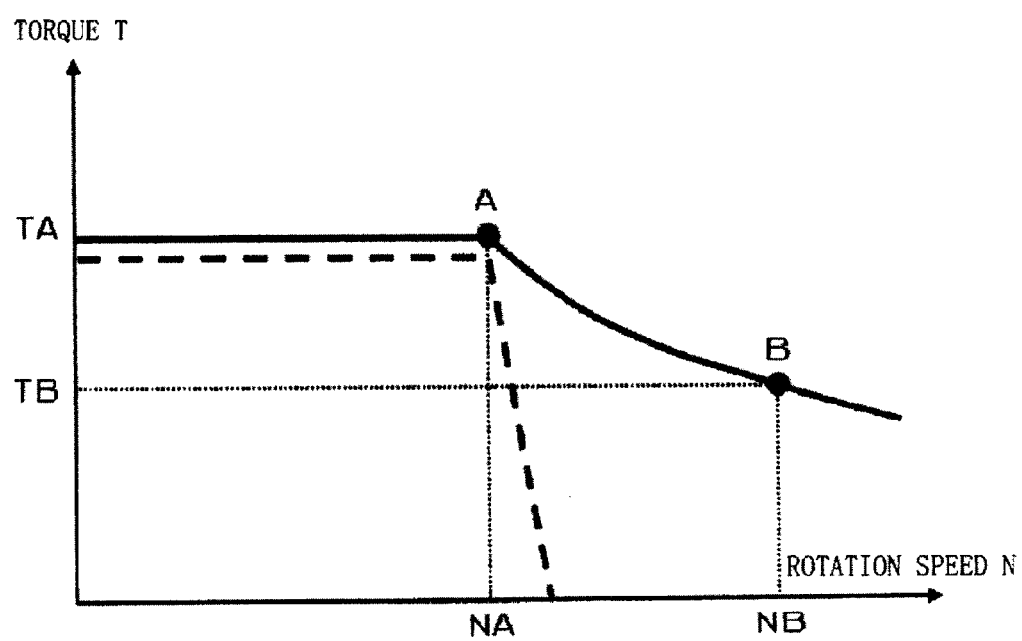
FIG. 4 is a graph exemplifying a difference in characteristic of a maximum (generated) torque with respect to a motor rotation speed depending on whether or not the d-axis current command and the q-axis current command shown in FIG. 3 are given (whether or not field control is performed)

Here, an example of a relation between the rotation speed and the maximum torque of the motor in the case where the d-axis current and the q-axis current are controlled as shown of FIG. 3 is shown in FIG. 4. A curve indicated by a broken line of FIG. 4 shows an example of the relation between the rotation speed and the maximum torque of the motor in the case where the control of the d-axis current and the q-axis current as shown in FIG. 3 is not performed (field control is not performed).

In the case where the d-axis current and the q-axis current are controlled (field control is performed) as indicated by a solid line of FIG. 4, a maximum torque TA is maintained from a point at which the rotation speed is zero to a point A at which the rotation speed becomes NA. After the rotation speed exceeds NA, however, the maximum torque decreases as the rotation speed increases. At a point at which the rotation speed is NB, the torque becomes TB indicated by a point B.

Specifically, the torque is maintained at the maximum torque TA determined by current limitation from the point at which the rotation speed is zero to the point at which the rotation speed is NA and has the torque curve determined by the current limitation and voltage limitation in the range where the rotation speed is equal to or higher than NA. By the field control as described above, the generation of the torque equal to or larger than the predetermined value can be ensured even in the range where the rotation speed is higher than NA.

In the case where the field control is not performed, specifically, the value of the d-axis current command is zero, the maximum torque from the point at which the rotation speed is zero to the point at which the rotation speed is NA is slightly lower than TA, as indicated by the broken line of FIG. 4. Further, the generated torque suddenly drops in the range where the rotation speed is higher than NA. Therefore, the generation of the torque is not expected in the range where the rotation speed is higher than NA.

Returning to FIG. 2, the d-axis current command and q-axis current command from the d-/q-axis current command section 205 are input to a d-/q-axis current control section 206.

An output AC current from the inverter 21 is detected by a current detector 209. The signal detected by the current detector 209 is detected by a coordinate converting section 210 as a d-axis current detection signal and a q-axis current detection signal on a d-axis and a q-axis, respectively. The d-/q-axis current control section 206 is operated by the command signals from the d-/q-axis current command section 205 and feedback signals from the coordinate converting section 210 to output signals for commands of the d-axis voltage and the q-axis voltage. The signals are converted into voltage commands in a rest frame through the coordinate Converting section 207 to be then input to a pulse width modulation (PWM) control section 208. In this manner, the inverter 21 is subjected to PWM control.

The method of controlling the AC current of the inverter 21 with the configurations of the d-/q-axis current control section 206, the coordinate converting section 207, the PWM control section 208, the current detector 209, and the coordinate converting section 210 illustrated in FIG. 2 is known as vector control for the AC motor 1. Therefore, the detailed description thereof is herein omitted.

Figure 5:
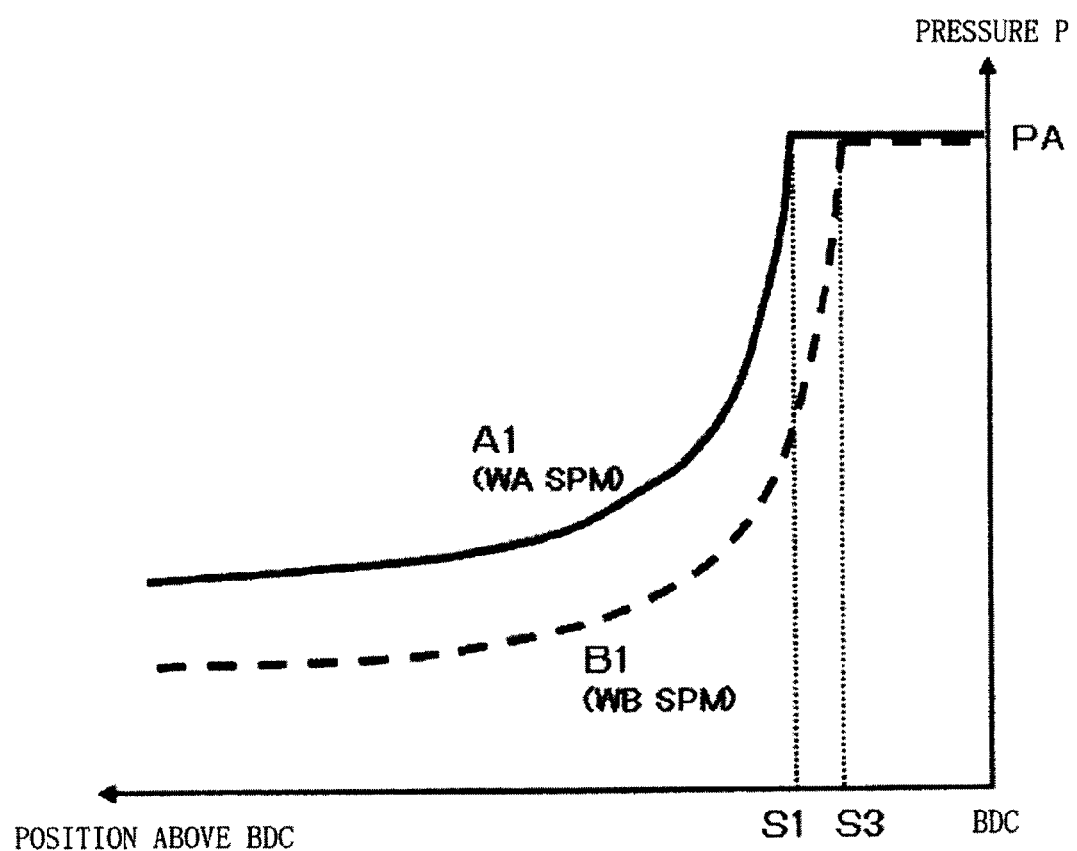
FIG. 5 is a graph showing an example of setting of a characteristic of a slide operation of the press machine, for which the control method of the first to third embodiments is used.

Next, an operation of the capacity setting section 201a is described referring to FIG. 5.

FIG. 5 shows stroke pressure curves in the case where mechanical dimensions such as a stroke length are fixed to the same values in the press illustrated in FIG. 1. An ordinate axis indicates a pressure force of the slide, whereas an abscissa axis indicates a distance from the lowermost position (BDC) of a lower surface of the slide to the current position of the lower surface of the slide. In this case, it is supposed that the AC motor (servomotor) 1 has the relation between the rotation speed and the maximum torque, which is shown by the curve of FIG. 4.

In the example of FIG. 5, when the torque generated by the servomotor 1 is TA shown in FIG. 4, the maximum pressure force PA (pressure capacity) of the press machine is obtained when the slide is equal to or lower than a position S1 above BDC. A stroke pressure curve in this case is indicated by a solid line A1.

The stroke pressure curve A1 represents a characteristic obtained when the motor torque is TA. Therefore, for the stroke pressure curve A1, the motor rotation speed is NA or lower as shown in FIG. 4, and a corresponding operating speed of the press (hereinafter, referred to as strokes per minute (SPM)) is WA or less.

On the other hand, when the motor torque is TB, the maximum pressure force PA of the press machine is obtained at a position S3 above BDC or lower. The stroke pressure curve in this case is indicated by B1 (broken line).

The stroke pressure curve B1 represents a characteristic obtained when the motor torque is TB. Therefore, the motor rotation speed is NB or lower as shown in FIG. 4. Specifically, the corresponding press SPM is WB or less.

At this time, the capacity setting section 201a selects any one of the stroke pressure characteristic A1 with the SPM being WA and the stroke pressure characteristic B1 with the SPM being WB.

When the stroke pressure characteristic A1 is set, press working with the maximum pressure force PA at the SPM of WA is ensured up to the position S1 above BDC. On the other hand, when the stoke pressure characteristic B1 is set, the press working with the maximum pressure force PA at the SPM of WB is ensured up to the position S3 above BDC.

In this case, WA<WB is satisfied. Specifically, in the case of the press working which requires the maximum pressure force applied from a high position above BDC (position far from BDC), the characteristic A1 is set. With the setting of the characteristic A1, the SPM ensured thereby is WA.

On the other hand, in the case where it is sufficient to demonstrate the maximum pressure force applied from a low position above BDC (position near to BDC), the ensured press SPM can be increased to WB by setting the characteristic B1. Therefore, efficiency and productivity of the press operation can be improved.

As described above, the press capacity can be selected based on the trade-off between the position where the capacity for generating the maximum pressure force is generated and the SPM at the time of generation of the maximum pressure force. Specifically, for example, the capacity can be selected depending on which of the position where the capacity for generating the maximum pressure force is generated (torque capacity) and the press operating speed is regarded as more important. In the example of setting according to this embodiment, the motor is operated along the torque characteristic shown in FIG. 4. Therefore, for the maximum torque of the motor, the characteristic showing the relation between the rotation speed and the maximum torque shown in FIG. 4 is set as the actual torque command limitation for the motor in the torque limiting section 204.

For example, it is supposed that a command for a motion with the motor rotation speed higher than NA is issued, that is, a command for the SPM higher than WA is issued in the case where the characteristic A1 is selected. In this case, when the rotation speed becomes higher than NA, the maximum torque is lowered, as shown in FIG. 4. Therefore, the stroke pressure curve A1 is not ensured, resulting in a stroke pressure curve with a smaller torque. When the required pressure force is high, the processing is impaired thereby. Therefore, at the time of the motion setting or the operation, a warning may be issued by an alarm or the like. However, the operation of the press machine can be continued as long as the processing is not adversely affected by a lowered speed for pressing because the operation of the motor itself is not impaired by the lowered torque. Then, the same operation is performed even in the case where the characteristic B1 is selected. For example, in the case of processing which requires the maximum pressure force when the slide is in the position S1 at the time of pressing and originally requires the characteristic A1 at the SPM of WB, the operation at WB cannot be performed. Therefore, at the time of the motion setting or the operation, the warning may be issued by the alarm or the like. However, the operation of the press machine can be continued as long as the processing is not adversely affected by the lowered speed for pressing because the operation of the motor is not impaired.

The operation characteristic with the lowered maximum motor torque at the high SPM is used for a slide motion which does not particularly require a large motor torque, for example, a motion of driving the slide at a higher speed during time other than the press working than a speed for the press working. Specifically, because the slide is operated at the high speed during the time other than the press working, the operation characteristic can be used for purposes which require a torque for acceleration/deceleration of the slide.

The motion described above can be used as a motion for achieving both the capacity at the time of press working (slide position, speed, and torque capacity) and the high productivity at the same time.

In the manner described above, the press capacity is selected by selecting the stroke pressure characteristic in this embodiment. The field control with the d-/q-axis current control is used for selecting the press capacity. Therefore, the desired type of processing can be selected according to the processing conditions without changing the capacity of the inverter such as the maximum current or the maximum output current, or increasing the size of the motor itself.

When the field control is not performed, the torque generated by the motor suddenly drops in the range where the rotation speed is equal to or higher than the rotation speed NA, as indicated by the broken line shown in FIG. 4. Therefore, changing the setting of the stroke pressure characteristic itself does not produce any effects (substantially no effect because a difference in stroke pressure characteristic is small).

On the other hand, if the torque capacity of the press can be selected by using the field control as in this embodiment, the capacity of the press can be selectively varied according to purposes. Specifically, the press with the capacity indicated by A1 shown in FIG. 5 is achieved in one case, and the press with the capacity indicated by B1 shown in FIG. 5 is achieved in another case.

The example where the selection and the switching are made between the two capacity settings has been described. However, the selection may also be made from two or more capacity settings. Further, the switching and the setting may be made so as to be continuously (smoothly) performed. The selection of the capacity is not only manually input but can also be automatically input according to a die to be used. Alternatively, the selection of the capacity may be set from a superior control system. The torque capacity (capacity of generating the pressure force applied to the work piece) can be controlled to be changed during the press stroke.

Moreover, the stroke pressure curve (torque capacity) is selected as the setting performed in the capacity setting section 201a in this embodiment. However, as is understood from the description given above, the press SPM or the motor rotation speed, which ensures the torque capacity of the press, may alternatively be set (for example, so that the maximum motor torque is determined by setting the maximum SPM, which determines the stroke pressure curve) in the capacity setting section 201a.

The stroke pressure curve (torque capacity) can also be set selectable so that the position above BDC, that is, the position where the capacity for ensuring the maximum pressure force is generated is appropriately changed. Further, in response to requests for the SPM, for the position where the capacity is generated, and the like, the stroke pressure curve (torque capacity) may be selected and switched so that the setting can be changed by appropriately combining the SPM, the position where the capacity is generated, and the like.

Variably setting the position where the capacity for ensuring the maximum pressure force is generated is effective because the position where the capacity is generated is determined according to a gear strength (torque resistance) for the required pressure force in the simple crank press.

Further, other settings which make the gist of this embodiment effective may also be used.

Second Embodiment

Figure 6:
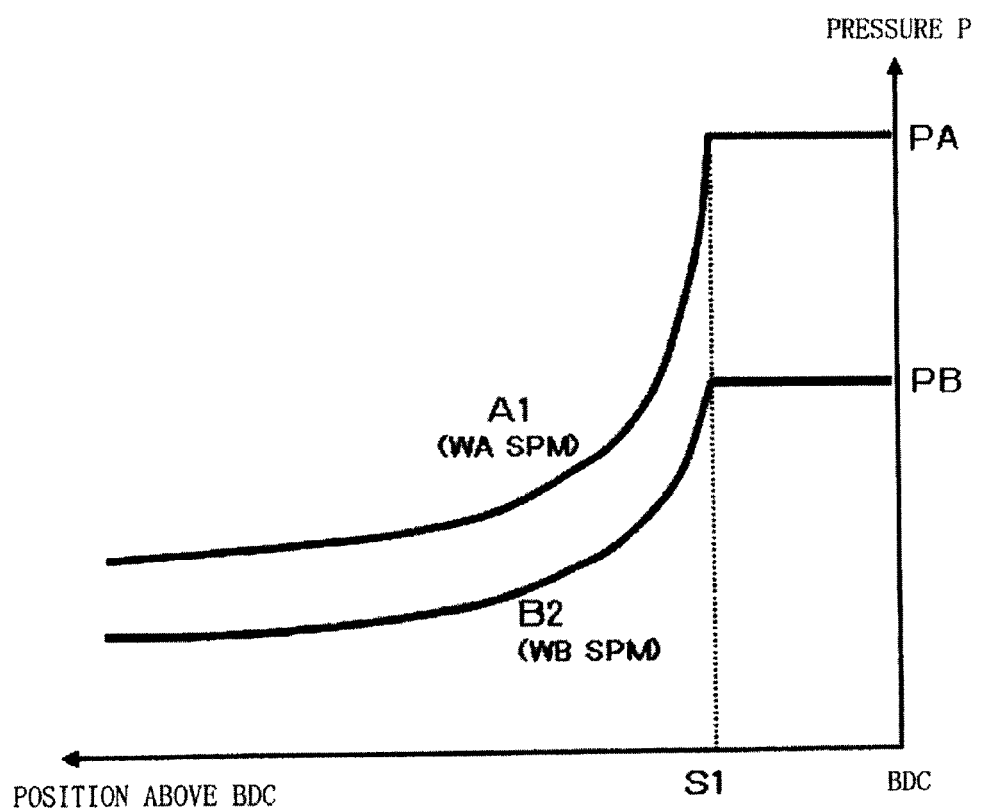
FIG. 6 is a graph showing another example of the setting of the characteristic of the slide operation of the press machine, for which the control method of the first to third embodiments is used.

FIG. 6 is a graph showing an example where stroke pressure curves different from those shown in FIG. 5 are set.

This embodiment is an example where the maximum torque generated (output) by the motor is limited by the field control and, in addition, the mode of generation of the torque is changed with respect to the position of the slide 6 above BDC (angular position of the crank).

In the capacity setting section 201a according to this embodiment, the maximum pressure force (pressure capacity) of the slide 6 under control is selected. The maximum pressure force under control at the same position where the capacity is generated, that is, at the same position above BDC, is selected. In other words, for example, PA or PB shown in FIG. 6 is selected.

Now, if the stroke pressure curve A1 for PA as shown in FIG. 6 is set as the maximum pressure force under control, the torque limiting section 204 operates to limit the maximum value of the torque command to TA (see FIG. 4 and the like). In this case, in the case where the motor speed is NA (corresponding press SPM is WA) or lower, the pressure force with the motor torque TA is indicated by a stroke pressure curve A1 shown in FIG. 6 (which is the same as the stroke pressure curve A1 shown in FIG. 5) when the position of the slide above BDC is S1 or higher. The pressure force traces the curve A1 according to the position of the slide 6 above BDC. The pressure force reaches the mechanical limit PA at the point where the position of the slide 6 is S1 and is maintained to the mechanical limit PA from the point where the position of the slide 6 is S1 to the point where the position of the slide 6 is BDC.

Next, when a stroke pressure curve B2 with the maximum pressure force under control being PB is set in the capacity setting section 201a, the torque limiting section 204 performs the operation so that a maximum value of the torque command is limited to TB (see FIG. 4 and the like). In the case where the motor speed is NB (corresponding press SPM is WB) or less, the stroke pressure curve B2 shown in FIG. 6 is obtained when the slide 6 is in the position S1 above BDC or higher. The pressure force traces the stroke pressure curve B2 according to the position of the slide 6 above BDC. Then, the pressure force reaches the set value PB at the point where the position of the slide 6 is S1 and is maintained to PB from the point where the position of the slide 6 is S1 to the point where the position of the slide 6 is BDC.

In this case, in the case where the maximum torque of the motor is set to TB, the pressure force exceeds PB when the position of the slide 6 becomes closer from S1 to BDC. Therefore, the maximum value of the motor torque is controlled to be lower than TB according to the position of the slide 6 above BDC so that the pressure force does not exceed PB. The control described above is performed by the torque limiting section 204.

Figure 7:
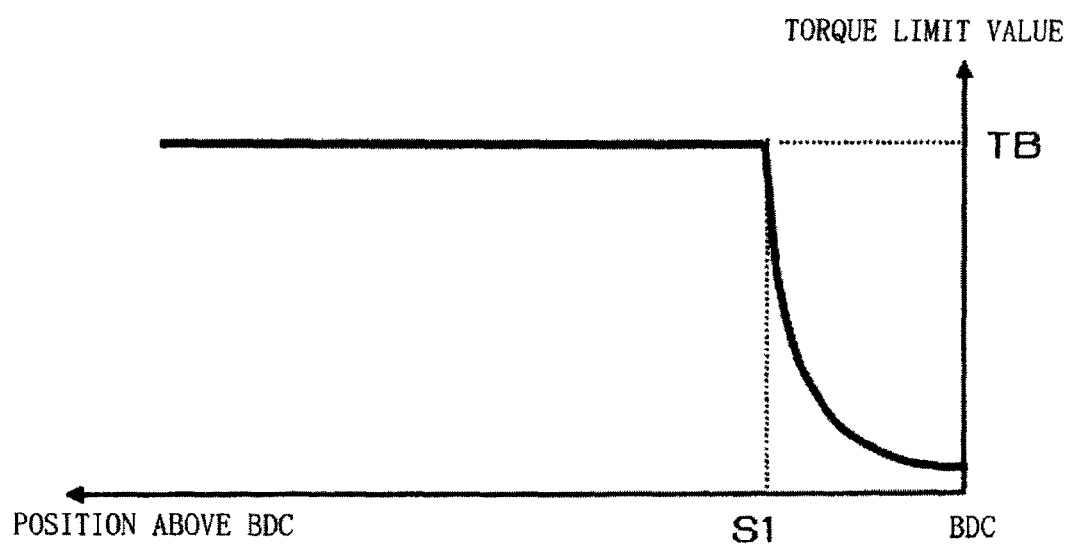
FIG. 7 is a graph showing an example of torque command limitation for realizing the characteristic shown in FIG. 6.

FIG. 7 is a graph showing an example of the torque limitation when the maximum pressure force under control is set to PB (see FIG. 6). When the motor torque is limited as described above, the obtained pressure force is maintained at the set pressure force (maximum pressure force) or lower. Therefore, the occurrence of abnormality to the die or the like can be prevented.

For example, the magnetic field is continuously changed according to a press stroke for bringing the slide from the position S1 above BDC closer to BDC so that the maximum torque of the motor is continuously reduced. In this manner, the maximum pressure capacity (pressure capacity) can be kept constant.

When the stroke pressure curve is set to A1 (the maximum pressure force under control is set to PA), the maximum pressure force PA is ensured at the SPM equal to or smaller than WA. When the stroke pressure curve B2 is set (the maximum pressure force under control is set to PB), the maximum pressure force PB is ensured at the SPM equal to or smaller than WB.

In this case, WA<WB is satisfied. Specifically, in the case of the processing requiring a high pressure force, when the curve A1 for the higher maximum pressure force PA is set, the SPM ensuring PA is WA. On the other hand, in the case where a lower pressure force is sufficient, the press SPM ensuring PB can be increased to WB by setting the curve B2 of the pressure force PB. Therefore, the efficiency and the productivity of the press operation can be improved.

As described above, the capacity of the press can be selected based on the trade-off between the maximum pressure force under control and the SPM at which the maximum pressure force is obtained. Specifically, the capacity can be selected depending on which of the pressure force and the press operating speed is regarded as more important. For example, it is assumed that a command for a motion with the motor rotation speed higher than NA (see FIG. 4 and the like) is given, that is, a command for the SPM higher than WA is given in the case where the stroke pressure curve A1 is selected. In this case, the maximum torque is reduced when the rotation speed becomes higher than NA as shown in FIG. 4. Therefore, the stroke pressure curve A1 is not ensured, which results in a stroke pressure curve with a smaller torque. Thus, if the slide 6 is in the position where a high pressure force is required, the processing is impaired. Accordingly, the warning may be issued at the time of motion setting or the operation, as in the first embodiment. However, the operation of the press machine can be continued as long as the processing is not adversely affected by the lowered speed at the time of pressing because the operation of the motor itself is not impaired. The same operation is performed in the case where the stroke pressure curve B2 is selected.

Therefore, the operation characteristic as described above can be used for a motion which does not particularly require a large motor torque, for example, a motion of driving the slide at a higher speed during the time other than the press working than the speed during the press working.

Specifically, the operation characteristic can be used for a propose in which the slide 6 is operated at a high speed during the time other than the press working in one reciprocating stroke of the slide 6 (purpose in which the output of the torque for operating the slide 6 is sufficient). The motion as described above can be used as a motion for achieving both the press working and the high productivity.

The example where the selection and the switching are made between the two capacity settings has been described. However, the selection can also be made from two or more capacity settings. Further, the switching and the setting may be made so as to be continuously (smoothly) performed. The selection of the capacity is not only manually input but can also be automatically input according to the die to be used. Alternatively, the selection of the capacity may be set from the superior control system. The torque capacity (capacity of generating the pressure force applied to the work piece) can be controlled to be changed during the press stroke.

Moreover, as is understood from the description given above, the maximum pressure force under control may be set in the capacity setting section 201a or the press SPM or the motor rotation speed, which ensures the maximum pressure force, may be set. In addition, those elements may be set in combination.

Further, other settings which make the gist of this embodiment effective may also be used.

Third Embodiment

Figure 8:
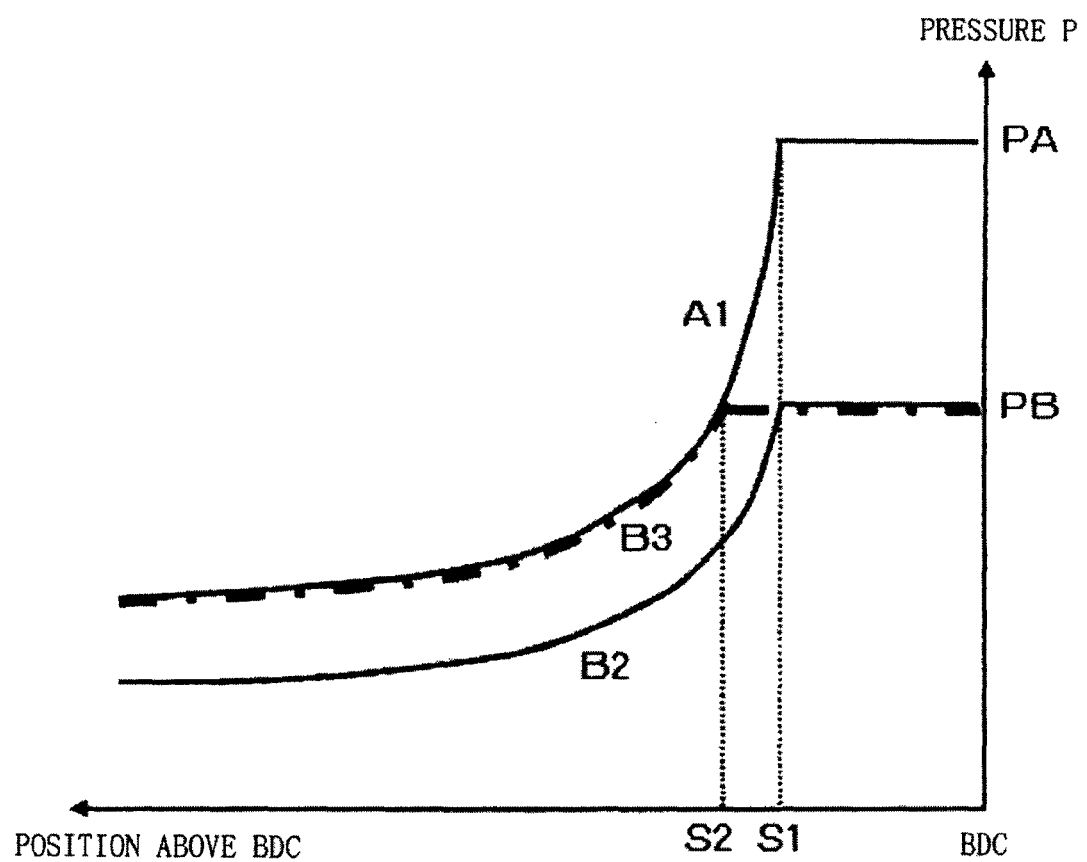
FIG. 8 is a graph showing a further example of the setting of the characteristic of the slide operation of the press machine, for which the control method of the first to third embodiments is used.

FIG. 8 is a graph showing an example where stroke pressure curves different from those shown in FIGS. 5 and 6 are set.

A third embodiment is an example where the maximum torque generated (output) by the motor is limited by the field control and, in addition, various modes of the generation of the torque with respect to the position of the slide 6 above BDC (angular position of the crank) until the torque reaches the maximum generated (output) torque can be selected.

As in the second embodiment, the maximum pressure force under control is set in the capacity setting section 201a in this embodiment. However, the stroke pressure curves are different from those described in the second embodiment. Specifically, the stroke pressure curve obtained when the maximum pressure force (pressure capacity) under control is set to PA is the same, that is, A1 even in this embodiment. However, when the maximum pressure force under control is set to PB, the stroke pressure force has a characteristic B2 or B3 according to the motor speed (press SPM).

The description of the case where the maximum pressure force under control is set to PA is the same as that of the first or second embodiment, and therefore, is herein omitted. Thus, the case where the maximum pressure force under control is set to PB is described below.

As shown in FIG. 6, when the press is operated at the press SPM of WB, the stroke pressure curve is B2 and the position of the slide 6 above BDC where the pressure force PB can be generated is S1 or lower. As the SPM decreases, that is, as the motor rotation speed decreases from NB, the maximum torque of the motor is increased. Therefore, the position of the slide 6 above BDC where the set pressure force can be generated becomes higher.

When the rotation speed drops from NB to NA, an operating point of the motor corresponds to the point A on the curve indicating the relation between rotation speed and the torque, which is shown in FIG. 4. At this time, the SPM is WA.

Specifically, in the case where the SPM is WA, the pressure force traces the curve B3 indicated by an alternate long and short dash line when the set maximum pressure force is PB, as shown in FIG. 8.

As described above, the SPM can be set to WB in the range where the position of the slide is BDC to S1. However, when the position of the slide exceeds S1 to be separated away from BDC, the SPM gradually decreases. In the position S2, the SPM is WA (<WB). As the SPM decreases from WB to WA, the stroke pressure curve gradually shifts from B2 to B3.

Figure 9:
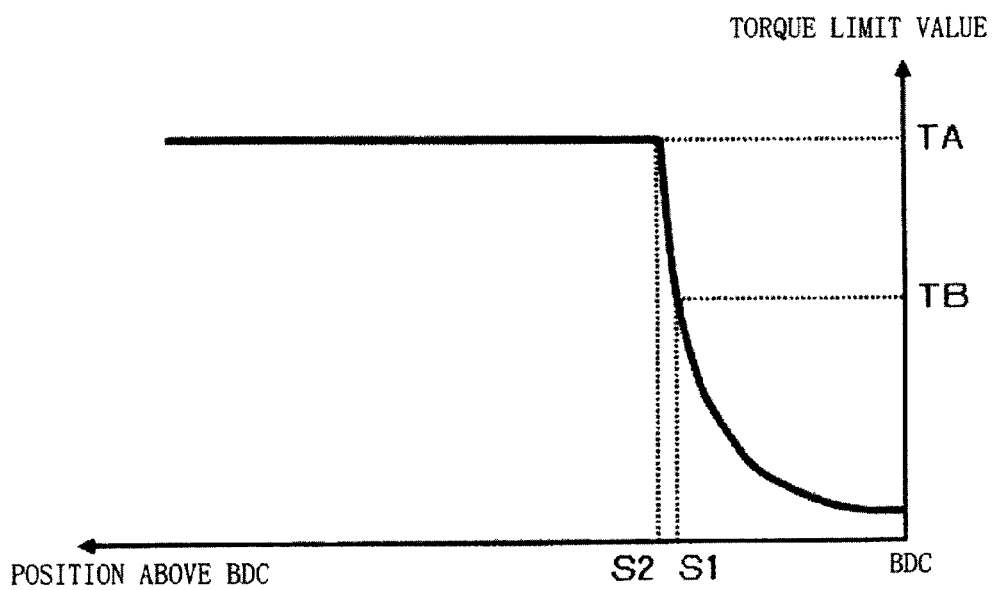
FIG. 9 is a graph showing an example of the torque command limitation for realizing the characteristic shown in FIG. 8.

The torque limitation of the motor with respect to the position above BDC when the pressure force is set to PB is shown in FIG. 9.

With the torque limitation, the torque is the maximum torque TA when the slide is above the position S2 above BDC as shown in FIG. 9. Then, the torque is gradually decreased from the point where the position of the slide is S2 and is limited to TB at the point where the position of the slide is S1. The region close to BDC, which is below S1, is the same as that shown in FIG. 7.

As in the example described above, the press capacity can be set so as to be variable according to the position of the slide. The example where the selection and the switching are made between the two capacity settings has been described. However, the selection may also be made from two or more capacity settings. Further, the switching and the setting may be made so as to be continuously (smoothly) performed. As in the other embodiments, the selection of the capacity is not only manually input but can also be automatically input according to the die to be used. Alternatively, the selection of the capacity may be set from the superior control system.

Fourth Embodiment

Figure 10:
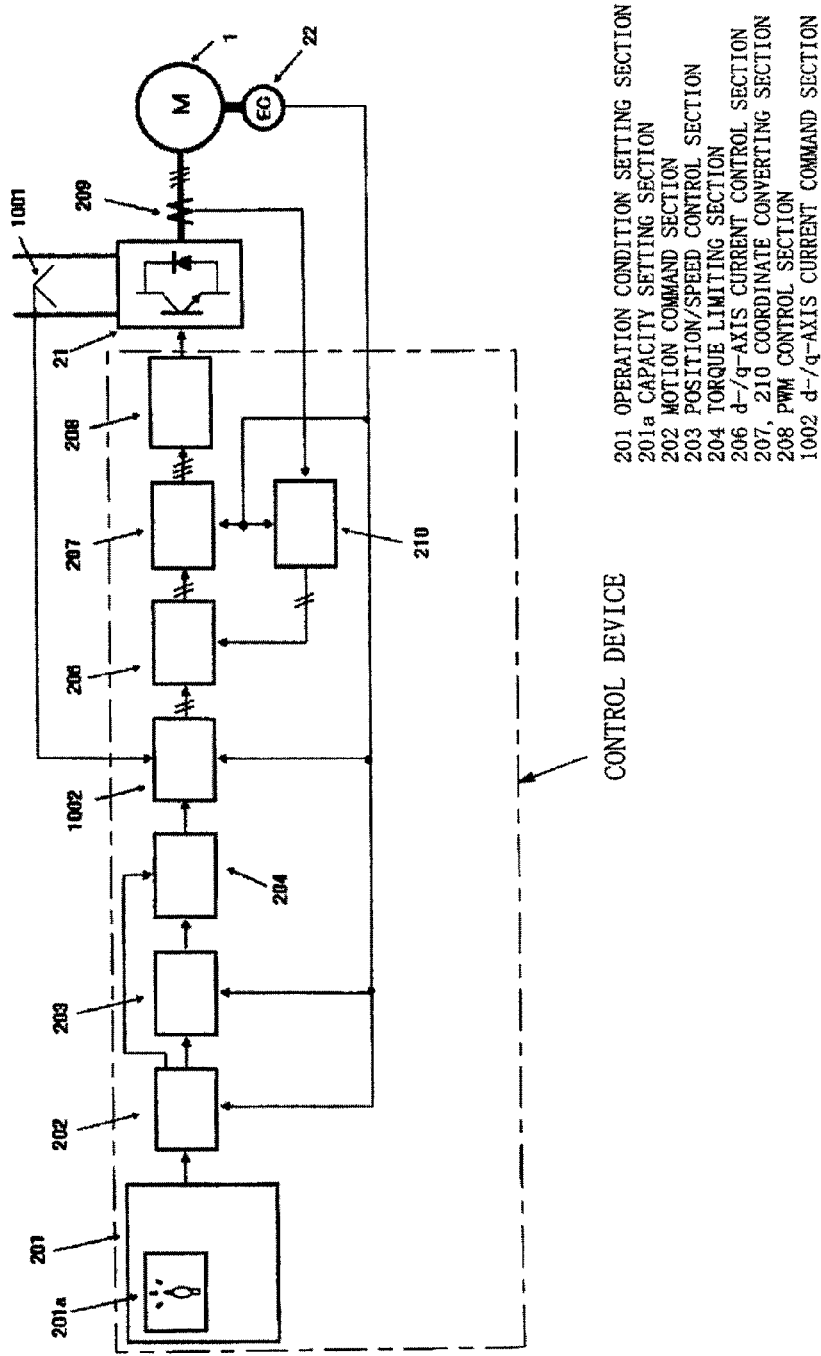
FIG. 10 is a control block diagram illustrating a control device according to a fourth embodiment of the present invention.

FIG. 10 illustrates an example of a configuration of a fourth embodiment according to the present invention.

The fourth embodiment differs from the first to third embodiments described referring to FIG. 2 in the method of giving the d-axis current command and the q-axis current command. In FIG. 10, the elements denoted by the same reference numerals as those of FIG. 2 are the same elements.

In the configuration of the fourth embodiment, as illustrated in FIG. 10, the DC voltage of the main circuit, which is input to the inverter 21, is detected by a voltage detector 1001. Then, the detected DC voltage (DC voltage value) is input to a d-/q-axis current command section 1002.

Figure 11:
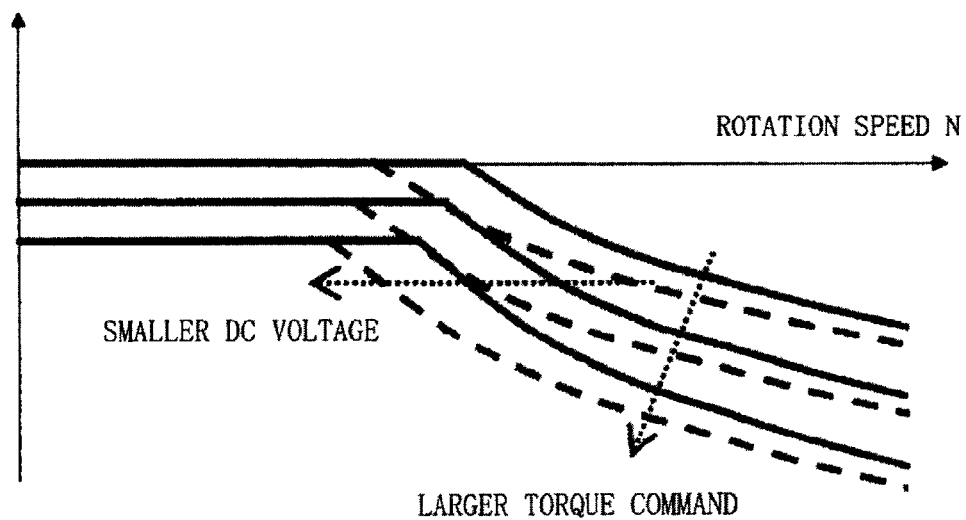
FIG. 11 is a map showing an example of setting of the d-axis current command according to a control method of the fourth embodiment.

FIG. 11 shows an example of the d-axis current command pattern. The d-axis current command is similar to that shown in FIG. 3. However, as the value of the torque command becomes larger, the command pattern becomes a pattern as indicated by solid lines of FIG. 11. In addition, when the DC voltage further decreases from a predetermined value, the d-axis current command value is set as indicated by broken lines according to the decrease in DC voltage.

By the setting as described above, the d-axis current value is changed even according to the DC voltage. The method described above is effective for a press machine with a large fluctuation in DC voltage.

The pattern of the d-axis current command shown in FIG. 11 is merely an example, and therefore is appropriately selected according to the motor structure or the desired accuracy for the torque control. The q-axis current command is determined in the same manner as that described in FIG. 3.

The d-axis current command and the q-axis current command may be realized by a pattern using the memory map or may be derived by an experimental expression. The d-axis current command and the q-axis current command are appropriately selected according to the configuration of the control system. Even when the d-axis current and the q-axis current are commanded in the manner as described above, the field control for the AC motor 1 can be realized.

For the d-axis current command and the q-axis current command described above, various setting methods described above can be used for setting the press capacity in the capacity setting section 201a. In this case, the torque characteristic with respect to the rotation speed of the motor changes according to the DC voltage value. Therefore, the press capacity is set in consideration of the change in torque characteristic.

Fifth Embodiment

Figure 12:
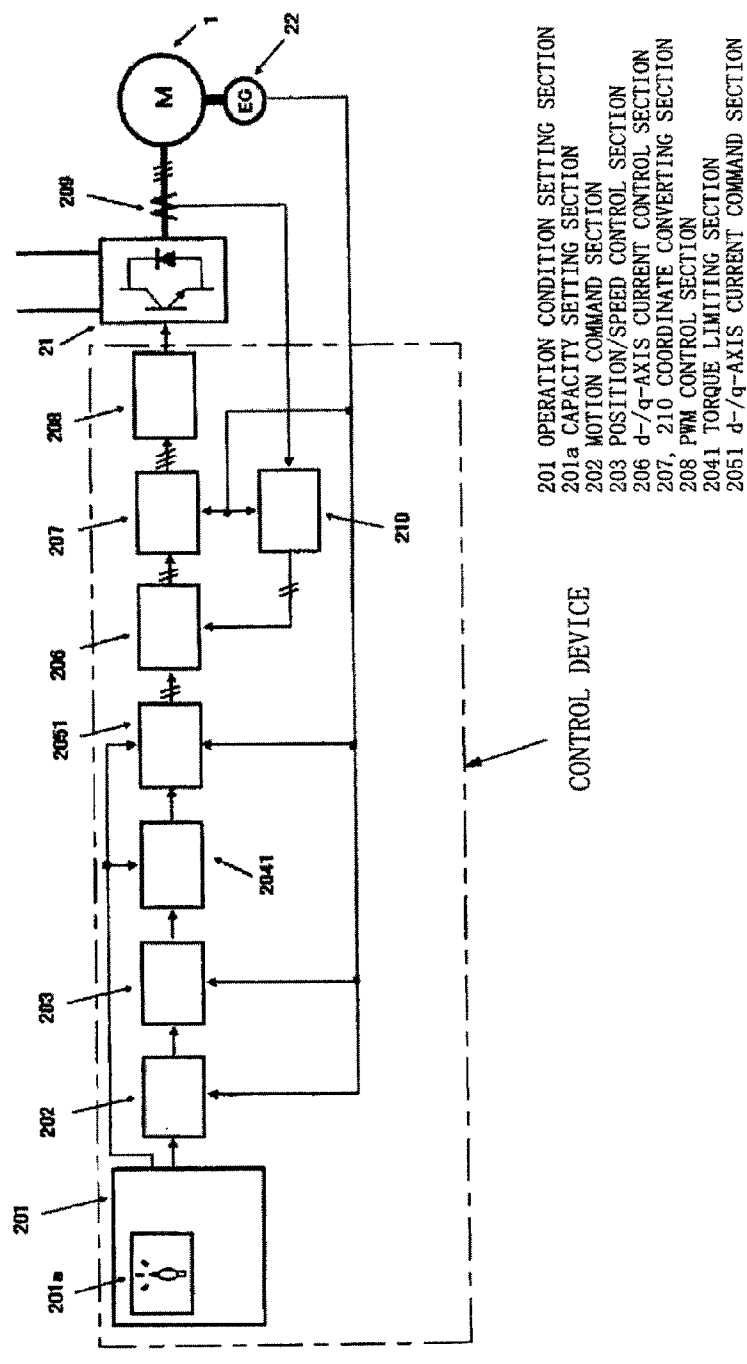
FIG. 12 is a control block diagram illustrating a control device according to a fifth embodiment of the present invention.

FIG. 12 illustrates an example of a configuration of a fifth embodiment according to the present invention. The fifth embodiment differs from the first to third embodiments described referring to FIG. 2 in the method of giving the torque limitation and the d-axis current command and the q-axis current command. In FIG. 12, the elements denoted by the same reference numerals as those of FIG. 2 are the same elements.

A continuous rating of the AC motor 1 differs depending on a load factor of the press machine. Even when the same press load is applied with the same motion (the same press working is performed), the continuous rating of the AC motor differs depending on the frequency of repetition of the operation, that is, average SPM (SPM not as the concept momentarily changing according to the position of the slide but as an average value over a relatively long period of time such as a time unit).

A value of the continuous rating of the motor is determined by a thermal factor, that is, a loss. When the field control is performed, an armature current increases so as to allow the d-axis current to flow, resulting in an increase in copper loss. In addition, as the d-axis current increases, the armature current increases. Therefore, the loss also increases. On the other hand, the maximum torque, which is determined by a motor constant, can be increased more by the effects of the field control by appropriately increasing the d-axis current in the range where the field control is performed.

In the case where the frequency of the press working (operation) is low, it is preferred to use a field control pattern which allows a larger maximum torque to be set in the range where the field control is performed. On the other hand, in the case where the frequency of the press working (operation) is high, it is preferred to use a field control pattern which allows the high continuous rating to be obtained even if the maximum torque in the range where the field control is performed is reduced by some degree.

In a control block diagram of FIG. 12, from the operation condition setting section 201, a signal indicating whether the operation is a low-frequency operation (low-frequency press working) or a high-frequency operation (high-frequency press working) is supplied to a torque limiting section 2041 and a d-/q-axis current command section 2051 in addition to the same signals as those in the embodiments described above.

Figure 13:
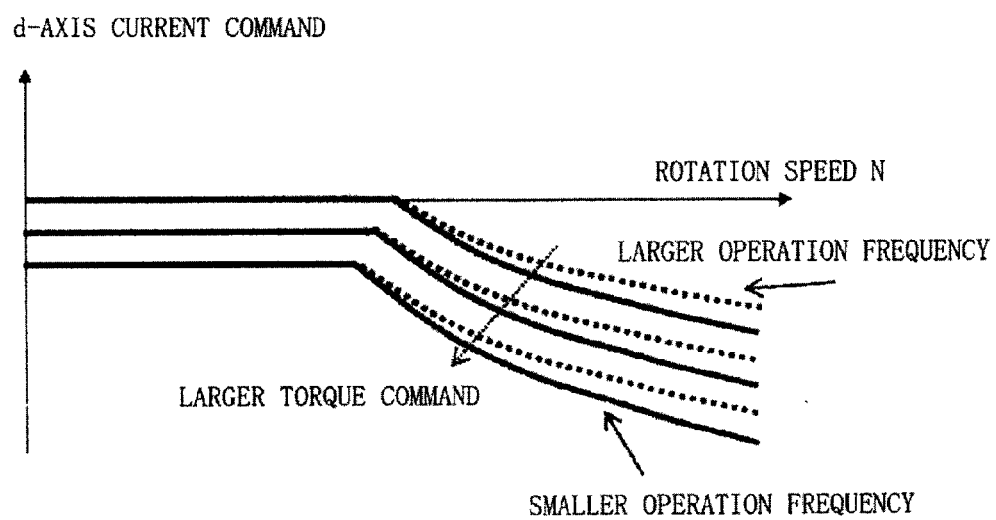
FIG. 13 is a map showing an example of setting of the d-axis current command according to a control method of the fifth embodiment.

FIG. 13 is a graph showing an example of the field control pattern in the case of the fifth embodiment and shows an example of the d-axis current command signal generated in the d-/q-axis current command section 2051.

In this embodiment, a pattern indicated by solid lines shown in FIG. 13 is selected when the operation is the low-frequency operation, whereas a pattern indicated by dotted lines shown in FIG. 13 is selected when the operation is the high-frequency operation.

Figure 14:
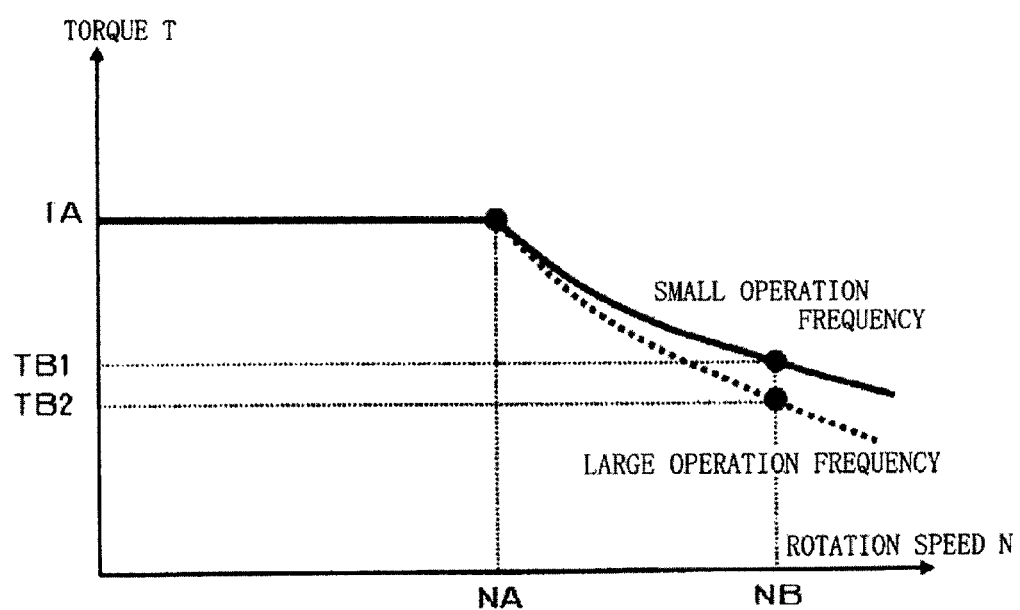
FIG. 14 is a diagram illustrating a difference in characteristic of the maximum (generated) torque with respect to the motor rotation speed depending on whether or not the d-axis current command and the q-axis current command shown in FIG. 13 are given (whether or not magnetic fried control is performed).

An example of the maximum torque of the motor in this case is shown in FIG. 14.

The maximum torque is larger for the low-frequency operation indicated by a solid line shown in FIG. 14 than for the high-frequency operation indicated by a broken line shown in FIG. 14. The maximum torque obtained at the rotation speed NB satisfies the relation: torque TB1 for low-frequency operation>torque TB2 for high-frequency operation.

As shown in FIG. 14, the large maximum torque is obtained in the case of the low-frequency operation. However, the copper loss is larger, and therefore, the motor loss is larger in the case of the low-frequency operation than those in the high-frequency operation because the d-axis current value (absolute value) is larger for the low-frequency operation than for the high-frequency operation as shown in FIG. 13.

The q-axis current command is obtained based on (Expression 1) described in FIG. 3 as in the other embodiments described above, and is appropriately issued according to the d-axis current command.

As described above, in this embodiment, the d-axis current command pattern and the q-axis current command pattern are changed as shown in FIG. 13 according to the frequency of the operation. The limit value of the torque limiting section 2041 is changed as shown in FIG. 14 according to the torque characteristic for the frequency of the operation.

In order to realize the changes described above in this embodiment, the capacity setting section 201a is configured so that the frequency of the operation is set therein. Alternatively, the operation condition setting section 201 is configured so that whether the operation is the high-frequency operation or the low-frequency operation is determined based on the press operation pattern including a repetition.

Although the selection is made from the two modes, that is, the low-frequency operation and the high-frequency operation in the description given above, the number of operation frequency modes that can be selected may be further increased or the modes of operation may be selected continuously. In this case, the pattern of the selection of the field control in the d-/q-axis current command section is changed according to the selection of the operation frequency.

Further, the optimal selection of the pattern of the d-axis current command also differs depending on the highest SPM of the press operation pattern. Therefore, the pattern of the d-axis current command may be selected according to the highest SPM. Specifically, an appropriate value of the d-axis current command differs depending on the operation pattern among the case where the maximum rotation speed of the motor reaches a value slightly higher than NA shown in FIG. 14, the case where the maximum rotation speed reaches NB, and the case where the maximum rotation speed reaches the maximum rotation speed exceeding NB. Therefore, it is preferred to set the pattern of the d-axis current command according to the appropriate value of the d-axis current command. In particular, the selection of the pattern of the d-axis current command becomes effective when the d-axis current command is given referring to the memory map or the like, the number of set patterns is limited, or the like.

As described above, in this embodiment, the d-axis current command pattern and the q-axis current command pattern are changed according to the operation pattern of the press machine such as the operation frequency or the maximum rotation speed of the motor. This embodiment can be carried out in combination with any of the embodiments described above.

As described above, according to the present invention, the press capacity can be selected by performing the field control. Although the press machine using the crank mechanism has been described as a typical example in each of the embodiments described above, the capacity can be varied in the same way even in a press machine using a mechanism other than the crank mechanism (for example, press machine using a ball screw or a linear motor).

Besides, various changes can be made without departing from the scope of the present invention.

According to the press machine of the present invention, the capacity (such as torque capacity or SPM) can be variably controlled according to various required characteristics even though the configuration of the press machine is simple and low-cost. Therefore, the press machine of the present invention is beneficial.

What is claimed is:

1. A press machine comprising:
   a slide;
   a motor for driving the slide; and
   a processor configured to perform field control for the motor, the field control being performed by changing variably a command value for a d-axis current, wherein
   the processor is configured to perform a variable control of a press capacity of the press machine by variably changing the d-axis current in accordance with one of stroke pressure characteristics for positions of the slide in one stroke of its reciprocating motion, and
   the processor is configured to select one of the stroke pressure characteristics based on a trade-off between a position of the slide where a maximum pressure force is generated and a strokes per minute (SPM) at a time of generation of the maximum pressure force.

2. The press machine according to claim 1, wherein, when the motor is an AC motor, the press machine is configured to obtain information related to the d-axis current based on at least one of a rotation speed of the motor, a torque command, and a DC voltage of a power converter for driving the motor, to perform the field control.

3. The press machine according to claim 1, wherein the press machine is configured to change the command value for the d-axis current in the field control according to an operation pattern of the press machine.

4. The press machine according to claim 1, wherein the press machine is configured to change the command value for the d-axis current in the field control according to an operation frequency.

5. A method of controlling a press machine for driving a slide by a motor, comprising performing field control to drive the motor, the field control being performed by changing variably a command value for a d-axis current, wherein
   the step of performing field control includes performing a variable control of a press capacity of the press machine by variably changing the d-axis current in accordance with stroke pressure characteristics for positions of the slide in one stroke of its reciprocating motion, the stroke pressure characteristics being selected based on a trade-off between a position of the slide where a maximum pressure force is generated and a strokes per minute (SPM) at a time of generation of the maximum pressure force.

6. The method of controlling the press machine according to claim 5, further comprising changing the command value for the d-axis current in the field control according to an operation pattern of the press machine.

7. The method of controlling the press machine according to claim 5, further comprising changing the command value for the d-axis current in the field control according to an operation frequency.

8. The press machine according to claim 1, wherein the press machine is configured to limit a torque command to the motor based on a content of the variable control of the press capacity.

* * * * *